United States Patent Office 2,766,174
Patented Oct. 9, 1956

2,766,174

SELF-STERILIZING ANTIHISTAMINIC SOLUTION OF 3-(p-CHLOROPHENYL)-3-(2-PYRIDYL)-N,N-DIMETHYL PROPYLAMINE

Edward J. Foley, Princeton, and Jan Ilavsky, Bloomfield, N. J., assignors to Schering Corporation, Bloomfield, N. J., a corporation of New Jersey No Drawing. Application April 6, 1953,
Serial No. 347,172

3 Claims. (Cl. 167—65)

The present invention relates to an antihistaminic composition which can be employed as such, or can be combined with various therapeutic agents which are likely to produce an allergic reaction so as to prevent or reduce such reaction.

It is the general object of the present invention to provide an antihistaminic preparation which is self-sterilizing in character and thus does not require the addition of a preservative.

It is a further object of the invention to provide an antihistaminic preparation which is characterized by an unusual degree of potency but which can, nevertheless, be injected without causing local or systemic reactions of an undesirable nature.

It is a further object of the invention to provide an antihistaminic composition which can be employed in small fractions of a cc. in conjunction with various therapeutic preparations, such as antigen compositions, and yet provide a sufficient antihistaminic effect to overcome the allergenic reactions to the antigen.

It is still a further object of the invention to provide an anti-histaminic composition which is highly effective in such small volumes that it can be added to the necessarily small volumes of drug solutions or suspensions which are to be injected subcutaneously or even intracutaneously.

Other advantages of the invention will become apparent from the more detailed description thereof hereinafter.

The invention relates in particular to an aqueous composition whose active component consists essentially of a compound falling with the following general formula:

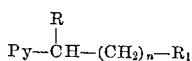

wherein Py is a member of the group consisting of pyridine and lower alkyl substituted pyridine rings; R is a phenyl nucleus; $R_1$ is a member of the group consisting of dimethylamino, pyrrolidino and piperidino groups; and $n$ is one of the integers 2 to 4; and the non-toxic salts thereof. The phenyl nucleus R may contain one or more substituents such as lower alkyl and lower alkoxy groups, hydroxyl and groups convertible thereto by hydrolysis, halogens (chlorine and bromine), amino, alkylamino, acylamino, nitro, carboxy and carbalkoxy. Compounds of this type and their method of manufacture are described in the patent to Sperber et al, No. 2,567,245, dated September 11, 1951, and are preferably employed in the form of their salts with inorganic and organic acids, such as hydrochloric, hydrobromic, sulfuric, phosphoric, salicylic, tartaric, maleic, succinic, citric and lactic acids.

Among these compounds, that in which the phenyl group is substituted by chlorine, and in which $R_1$ is dimethylamino and $n$ is 2, has proved to be eminently satisfactory in human therapy by reason of its strong antihistaminic action and freedom from side reactions, and has gone into wide use. Its chemical name is 3-(p-chlorophenyl)-3-(2-pyridyl)-N,N-dimethylpropylamine, and in the form of its maleate salt it is sold under the name "Chlor-Trimeton" by which name, for convenience, it will be referred to hereinafter, while the above-indicated compounds will, as a group, be referred to as "Trimetons."

Chlor-Trimeton is available on the market in the form of a 2 mg./cc. aqueous solution and has been found to be highly effective in such concentration. As the dosage of the antihistaminic is quite small, the 2 mg./cc. solution has in the past been found to be adequate to meet the needs of the physician in eliminating or preventing allergic reactions, and such solution has accordingly proved to be a convenient and effective composition. Where this preparation was packaged in multiple-dose ampules or other containers, it was provided with a preservative, as is usual in the art, in order to prevent contamination by microorganisms of the remaining contents of the ampule or the like, from which less than all of the dosage units had been removed.

There is an abundant literature on the use of various types of antihistaminics, and the use of antihistaminic compositions, both separately and together with various therapeutic agents likely to produce allergic reactions in a certain percentage of the cases treated, is now well known. Chlor-Trimeton has been found in clinical use to be a much more powerful antihistaminic agent than all other commercially available antihistaminic preparations. Thus, it has been found that Chlor-Trimeton is about 12 to 15 times as effective as other widely sold antihistaminics. In view of this circumstance, the 2 mg./cc. solution in which Chlor-Trimeton has been marketed has proved to be an entirely satisfactory concentration and there appeared to be no sound reason for marketing higher concentrations of the drug.

Also, because Chlor-Trimeton is a synthetic substance and is quite foreign to the body tissues and body chemistry, it was desirable to inject the same in highly dilute solution, so as not to cause possible local irritation arising from a high local concentration of the drug. This administration of the antihistaminic in highly dilute solutions was favored and made possible by the fact, as indicated above, that it has a much more powerful antihistaminic action than the other antihistaminics now generally employed, high concentrations therefore being unnecessary.

The use of high concentrations of an antihistaminic was, in fact, contraindicated by clinical experience with other antihistaminics. Where such other antihistaminics were employed in concentrations sufficient to give the desired anti-allergenic effect in small volumes of solution for injection, the injection was accompanied by pain and was followed by a burning sensation and even by necrosis. Clinical experience of an extensive nature has demonstrated quite convincingly that the other known antihistaminics cannot safely be used in the high concentrations necessary for producing the requisite antihistaminic effect where the volume of injected material must be small, as in antigen therapy, because of the pain and the sloughing of the tissues.

It nevertheless occurred to us to investigate the properties of the higher concentrations of Chlor-Trimeton. We have found that high concentrations of Chlor-Trimeton in aqueous solution possess an important property not shared by the 2 mg./cc. solution, nor by the other antihistaminic solutions known prior to the present invention.

We have discovered that the more concentrated solutions of Chlor-Trimeton, containing 75 mg., and preferably more of the antihistaminic per cc., are self-sterlizing and bactericidal in character and therefore can be marketed without the addition of a preservative. This property is of particular advantage in the packaging of the antihistaminic solution in multiple dosage vials, bottles, ampules and the like, as such containers, after being opened for the removal of one or more but less than all of the dosage units contained therein, need not be stored under any special conditions or treated in any special way to prevent contamination or deterioration of the remaining contents. This simplifies the manufacture of injectable solutions and is a great convenience to the physician, as he is at all times certain that the solution is sterile, and need not observe any special precautions, such as storing the container under aseptic conditions or sterilizing the container and its contents before he again withdraws a dosage unit therefrom.

Whereas all other antihistaminic preparations presently on the market require the addition of a sterilizing and preserving agent, the use of such material is entirely unnecessary with the compositions of the present invention. The use of an added sterilizing or preservative agent is always undesirable as it may be irritating to the patient, and is particularly undesirable in compositions which have to be injected subcutaneously or intracutaneously. Our improved composition makes it possible for the first time to inject an effective antihistaminic agent by the subcutaneous and intracutaneous routes, which routes could not be availed of with other antihistaminic agents because they could not be used in the very high concentration required to produce the required antihistaminic effect, or not without causing considerable pain and even necrosis.

We have found that despite the high concentration of our solutions and despite their extraordinarily high potency, they can safely be injected either alone or mixed with various antibiotic solutions or suspensions, such as metal and procaine salts of penicillin, with antigens and with other therapeutic compositions, without pain and without danger of damage to the tissues.

The preferred composition in accordance with the present invention contains 100 mg. of Chlor-Trimeton per cc. of water (or other non-toxic solvent), and is devoid of added preservative.

A number of additional and important advantages flow from the use of a concentration of 75 or more mg./cc. of Chlor-Trimeton, and particularly of a concentration of 100 mg./cc., in conjunction with various therapeutic agents which have been found in a certain proportion of the cases treated to produce allergic reactions of various kinds.

In the use of our new compositions the necessary antihistaminic action can be imparted to a solution or suspension of a therapeutic agent without materially increasing the volume of liquid injected. Thus, to a 1 cc. suspension of procaine penicillin, it is sufficient to add $\frac{1}{10}$ cc. of our 100 mg./cc. solution of Chlor-Trimeton in water to suppress completely any allergic reaction. The same applies to injectable solutions of other derivatives of penicillin.

We have found further that our highly concentrated solutions of the antihistaminic can be injected even by themselves, i. e., unmixed with a therapeutic composition, without causing any pain, only a fraction of a cc. being required for the desired effect. In this respect our compositions are further distinguished over various other antihistaminics currently on the market which cause considerable pain to the patient where they are employed in concentrations sufficient in an equal volume of solution, to produce the necessary antihistaminic effect.

The use of our compositions is of particular advantage in connection with the subcutaneous or intracutaneous injection of antigens, in which case it is desirable to keep the volume of injected material as small as possible to avoid discomfort and pain to the patient. For such use, the 100 mg./cc. solution of the antihistaminic provides a convenient concentration for introducing the required quantity of antihistaminic without increasing the volume of the injected solution beyond the point of comfort.

It has been found in a number of separate investigations on a large number of patients that the self-sterilizing solutions of Chlor-Trimeton of the present invention are the only ones that can safely be employed in antigen therapy to reduce or eliminate both local and systemic, as well as immediate and subsequent reactions. Whereas it has heretofore been necessary to administer antigens slowly in order to avoid systemic reactions, the highly concentrated solutions of Chlor-Trimeton have been found to be so well tolerated parenterally that with their use a rapid increase in antigen dosage could be resorted to while simultaneously decreasing the likelihood of systemic reaction to the antigen. These solutions thus permit a much more rapid build-up of immunity in desensitization treatments. This result has been found to be impossible with other antihistaminic preparations, either because of lack of sufficient activity or because of the production of undesirable side effects.

The use of our novel composition has thus allowed of the increase in the dosage of allergens without causing any reaction, to as much as 2 to 10 times the single dose of the allergen which previously had produced an allergic reaction. This has made it possible to inject a larger total dose with fewer injections with reduced constitutional and local reactions, and without danger or possible reaction to a preservative, as none is present.

Our improved antihistaminic preparation has been found to be of great value also in the field of dentistry. The frequently occurring reactions to oral surgery, such as pain, swelling, edema, trismus, and excessive bleeding, have been markedly reduced and frequently completely eliminated by the intramuscular administration of about one-fifth of a cc. of a 100 mg./cc. solution of Chlor-Trimeton pre-operatively. When penicillin was administered along with the Chlor-Trimeton, the same reduction or elimination of unfavorable side effects was noted. Patients who received penicillin alone, although thereby protected against posible infection, exhibited all of the reactions which normally followed oral surgery. In addition, the concentrated dose of Chlor-Trimeton has been found to produce dryness of the mouth, which is an aid to the oral surgeon and contributes to the comfort of the patient during any prolonged oral operation. Here again the absence of a preservative contributed to the elimination of all side reactions.

The 100 mg./cc. preparation also provides the physician with a simple way of determining the quantity of solution to be added to the therapeutic agent to provide the required quantity of the antihistaminic.

Each hundredth of a cc. of 100 mg./cc. solution represents 1 mg. of the antihistaminic. The physician can thus easily measure the dosage or quantity of antihistaminic by withdrawing into a syringe graduated in hundredths of a cc. the easily calculated volume of solution. The possibility of error is therefore practically eliminated.

The Chlor-Trimeton solution can be mixed with the antibiotic, antigenic or other medicinal preparation by being withdrawn from the ampule or other container by means of a tuberculin syringe graduated as just indicated and mixed in the syringe with the medicinal agent by rotating the syringe. Where the medicinal agent is or contains a liquid material which is non-miscible with water, such as procaine penicillin in oil suspension, the Chlor-Trimeton solution is injected separately from the medicinal agent.

Our antihistaminic composition may be administered also intravenously besides intramuscularly, subcutaneously and intracutaneously. The usual dosage range is from 5 to 10 mg., but larger amounts such as 15 to 20 mg., or even as high as 30 mg. can be employed.

While in the foregoing we have by way of example made reference to Chlor-Trimeton (the maleic acid salt of 3-(p-chlorophenyl)-3-(2-pyridyl)-N,N-dimethylaminopropane), it will be evident that salts of the base with other acids can be employed, such as those mentioned hereinabove, and also the salts of the corresponding bromo compound and of the other compounds defined herein.

We claim:

1. An injectable antihistaminic preparation consisting of a solution of a non-toxic salt of 3-(p-chlorophenyl)-3-(2-pyridyl)-N,N-dimethylpropylamine in water in the porportion of at least 75 mg. of the antihistaminic to each cubic centimeter of water, said solution being self-sterilizing and requiring no added preservative to keep it sterile on repeated exposure to air.

2. An injectable antihistaminic preparation consisting of a solution of a non-toxic salt of 3-(p-chlorophenyl)-3-(2-pyridyl)-N,N-dimethylpropylamine in water in the proportion of 100 mg. of the anti-histaminic to each cubic centimeter of water, said solution being self-sterilizing and requiring no added preservative to keep it sterile on repeated exposure to air.

3. An injectable antihistaminic preparation consisting of a solution of the maleic acid salt of 3-(p-chlorophenyl)-3-(2-pyridyl)-N,N-dimethylpropylamine in water in the proportion of 100 mg. of the antihistaminic to each cubic centimeter of water, said solution being self-sterilizing and requiring no added preservative to keep it sterile on repeated exposure to air.

References Cited in the file of this patent

Howard: Modern Drug Encyclopedia and Therapeutic Index, 5th ed., page 207, Drug Publ., Inc., N. Y., February 1952. (Copy in P. O. S. L.)

Mitchell et al.: J. American Pharmaceutical Ass'n, vol. XLI, No. 9, Scientific Ed., pages 472–475. (Copy in P. O. S. L.)